(No Model.) 2 Sheets—Sheet 1.
W. WEBSTER, Jr.
APPARATUS FOR PURIFYING SEWAGE BY ELECTRICITY.
No. 397,407. Patented Feb. 5, 1889.
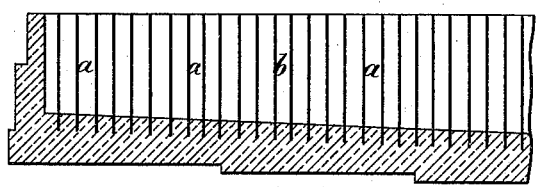
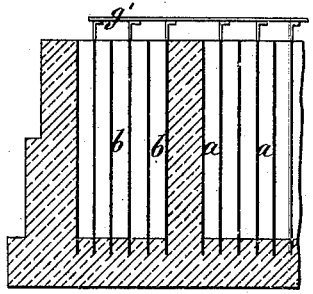
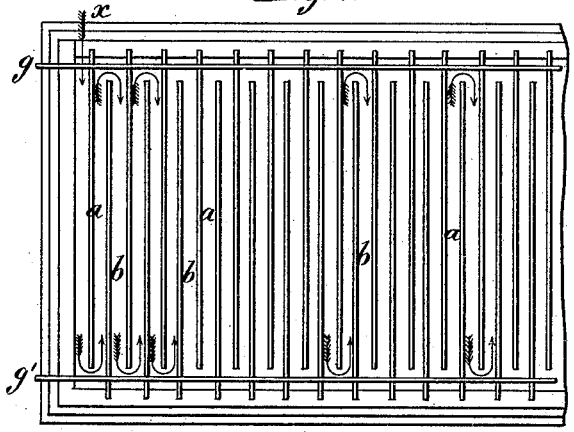
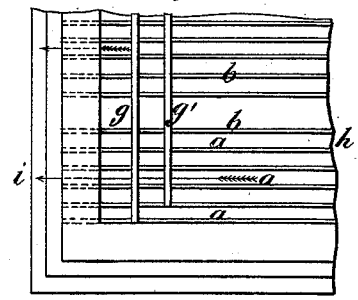
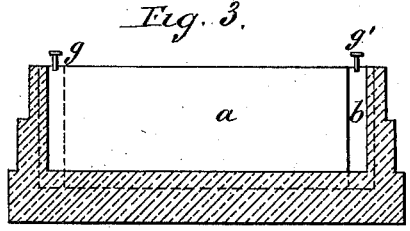
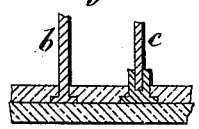
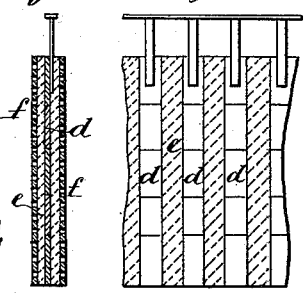
Witnesses.
H. R. McCready.
Robert Emmett.
Inventor
William Webster Jr.
By James L. Norris.
Atty.
N. PETERS, Photo-Lithographer, Washington, D. C.

(No Model.) 2 Sheets—Sheet 2.
W. WEBSTER, Jr.
APPARATUS FOR PURIFYING SEWAGE BY ELECTRICITY.
No. 397,407. Patented Feb. 5, 1889.
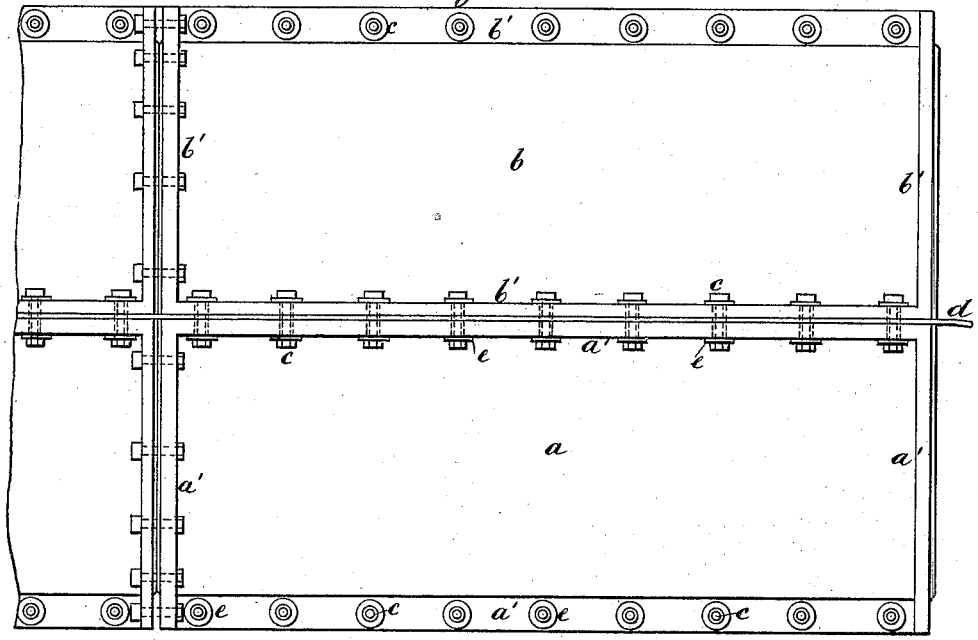
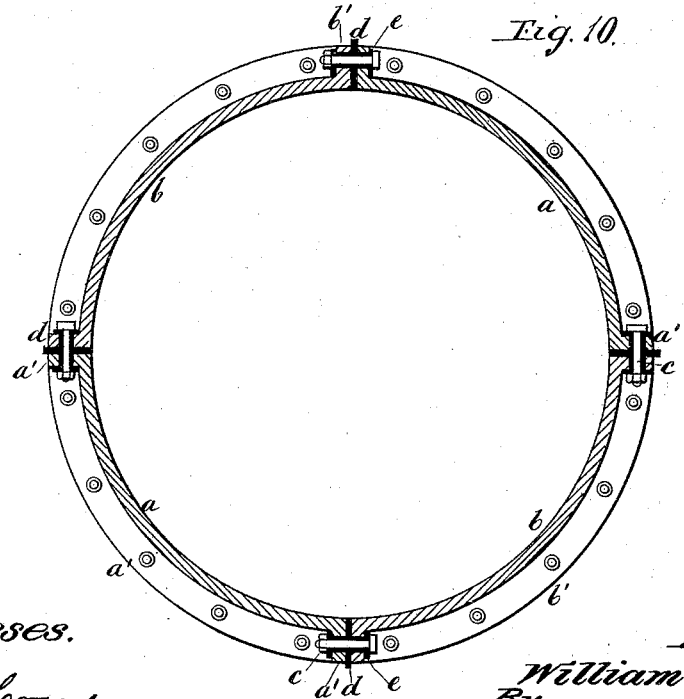
Witnesses.
H. R. McCrady,
Robt. Pruitt.
Inventor.
William Webster Jr.
By James L. Norris.
Atty.

UNITED STATES PATENT OFFICE.

WILLIAM WEBSTER, JR., OF LEE PARK, LEE, COUNTY OF KENT, ENGLAND.

APPARATUS FOR PURIFYING SEWAGE BY ELECTRICITY.

SPECIFICATION forming part of Letters Patent No. 397,407, dated February 5, 1889.

Application filed April 18, 1888. Serial No. 271,104. (No model.) Patented in England January 27, 1887, No. 1,333; in France December 9, 1887, No. 187,497; in Cape of Good Hope January 28, 1888, No. 436; in Natal February 2, 1888; in Victoria February 8, 1888, No. 5,615; in New South Wales February 10, 1888, No. 495; in South Australia February 10, 1888, No. 961; in Tasmania February 12, 1888; No. 540/10; in New Zealand February 20, 1888, No. 2,817, and in India April 13/28, 1888, No. 16/522.

*To all whom it may concern:*

Be it known that I, WILLIAM WEBSTER, Jr., a citizen of England, residing at Lee Park, Lee, in the county of Kent, England, have invented new and useful Improvements in the Treatment of Sewage and other Impure Liquids by Electrolytic Action for the Purification Thereof, (for which I have obtained a patent in Great Britain, dated January 27, 1887, No. 1,333; France, dated December 9, 1887, No. 187,497; Cape of Good Hope, dated January 28, 1888, No. 436; Natal, dated February 2, 1888; Victoria, dated February 8, 1888, No. 5,615; New South Wales, dated February 10, 1888, No. 495; South Australia, dated February 10, 1888, No. 961; Tasmania, dated February 12, 1888, No. 540/10; New Zealand, February 20, 1888, No. 2,817, and India, dated 13/28 April, 1888, No. 16--1888/522,) of which the following is a specification.

This invention has for its object to provide a novel, simple, and efficient apparatus for precipitating the solid matter suspended in sewage and oxidizing and purifying the albuminoids and other organic impurities held in suspension or solution therein.

To such end the invention consists in a tank or reservoir forming a channel of considerable length for the passage of the sewage and comprising positive and negative electrodes of extended surface, the negative electrodes being composed of iron, which is oxidizable, so that the nascent ammonia produces an alkaline reaction that effects the precipitation of the solid suspended matter in the sewage, while the nascent oxygen and chlorine at the positive electrodes produce an acid reaction, which decomposes and purifies the organic impurities held in suspension or solution in the sewage.

The invention is illustrated by the accompanying drawings, in which—

Figure 1 is a partial plan view of an apparatus embodying my invention. Fig. 2 is a partial longitudinal section, and Fig. 3 a transverse section, of said apparatus. Fig. 4 is a sectional detail view. Fig. 5 is a cross-section, and Fig. 6 a partial longitudinal section, of a modification, in which carbon plates are embedded in a layer of coke confined between perforated tiles. Fig. 7 is a partial plan, and Fig. 8 a part vertical section, of another modification, hereinafter described. Fig. 9 is a side view, and Fig. 10 a cross-section, of a further modification, showing the electrolytic apparatus in the form of a conduit or pipe.

In carrying out my invention I construct a reservoir in which are arranged electrodes extending alternately from opposite sides transversely across the reservoir or tank, so as to form this into a long narrow zigzag passage in the same, as indicated diagrammatically in Figs. 1, 2, and 3.

The positive electrodes $a\,a\,a$ are fixed to the one side of the reservoir and extend to within a certain distance of the other side, while the oxidizable negative electrodes $b$ are fixed to this side and extend to within a certain distance of the first-named side, all the electrodes being fixed either permanently or in a removable manner to the floor of the reservoir, thus forming a closed zigzag passage between them, into which the liquid to be treated enters at $x$, and in which it gradually flows along to the opposite end, where it is discharged, the bottom of the entire zigzag passage being made with a sufficient inclination to facilitate such flow at a slow velocity. The negative electrodes are built up of iron plates in any suitable manner, being either bedded into the bottom of the tank, as shown at $b$, Fig. 4; or they may be fitted at the bottom into sockets, as at $c$, of any suitable material, fixed in the bottom, so that the electrodes can be withdrawn and replaced when required. The negative electrodes are of iron, so that they are oxidizable, and by setting free ammonia and alkalies the solid matter suspended in the sewage is precipitated, which is not the case where non-oxidizable electrodes are employed. The positive electrodes $a$ are also of iron, so as to be oxidizable; but they may be of carbon or other suitable material. If made of carbon, they may be constructed as shown in cross-section and part longitudinal section at Figs. 5 and 6, where carbon plates $d$ are embedded in a layer of coke, e, confined between two walls, f, of perforated tiles.

The positive electrodes give better results when made of iron, so as to be oxidizable, in that they thereby form chlorides of iron at the positive pole that are partly precipitated by the alkaline reaction at the negative electrodes in the form of okide, which carries down with it the suspended organic matter.

The nascent chlorine produced as above described will have much greater efficiency than the chlorine present in chloride of lime, and the nascent oxygen will also have much more effect on the organic matter in the form of albuminoids than the oxygen of the atmosphere.

The electrodes being connected by conductors $g$ $g'$, respectively, to the positive and negative poles of a dynamo-electric machine or other generator of electricity, the sewage in passing in contact therewith will, as before stated, be acted upon by the nascent ammonia generated at the oxidizable negative electrodes $b$ and by the nascent oxygen and chlorine at the positive electrodes $a$, and the passage between these being comparatively narrow and of considerable length, it will be evident that by the time the liquid arrives at the discharge-opening all particles thereof will have been effectually brought in contact with both sets of electrodes and subjected to the above-described precipitating and purifying action.

If necessary, an outlet closed by a valve may be provided at the one end of each length of the zigzag passage, through which the accumulated solid deposit may be discharged from time to time. According to another modification, instead of forming a zigzag passage, I arrange the electrodes so as to form a number of separate long narrow passages, as indicated in part plan and part cross-section at Figs. 7 and 8, the sewage being admitted into each passage at the one end, $h$, and discharged at the other end, $i$. The partitions $a$ $a$ constitute, as before, the positive electrodes and the partitions $b$ $b$ the oxidizable iron negative electrodes.

Figs. 9 and 10 show, respectively, a side view and a cross-section of a modification in which the electrolytic apparatus is constructed as a closed conduit or pipe, in which the liquid is subjected to the electrolytic action while flowing from one locality to another. For this purpose the conduit, which is here shown cylindrical, but which may be of any other desired form, is constructed of separate oxidizable iron sections $a$ $a$ $b$ $b$, formed with flanges $a'$ $b'$, by which they are bolted together by means of bolts $c$, layers $d$ of a suitable non-conductor of electricity—such as asbestos—being interposed between the flanges, so as to insulate the sections from each other, for which purpose, also, the bolts $c$ are insulated by means of insulated asbestus linings and washers $e$. The sections may each be made up of separate lengths bolted together, with their meeting surfaces turned so as to fit accurately together and form a continuous conductor; or the separate lengths might also be insulated from each and connected to a separate external or internal conductor. The iron sections $a$ $a$ being connected to the positive pole of an electric generator, and the iron sections $b$ $b$ being connected to the negative pole, they constitute positive and negative electrodes, which act upon the sewage flowing through in the same manner as above described. When the conduits are of comparatively small diameter, they may be constructed of only two insulated sections, instead of four; or there may be a greater number than four employed. As the chemical action set up will gradually wear away the inner surfaces of the sections, these may be made of considerable thickness to withstand such wear; or they may be provided with a separate detachable lining-plate of iron, which is oxidizable, that can be removed when worn. In this case the said lining-plates of iron may be insulated from the body of the sections and be connected to the poles of the generator, so as alone to constitute the electrodes, the outer shell forming in that case merely an ordinary sewer-pipe.

With the above construction of the apparatus may be combined, at suitable intervals of the length, depositing-boxes for receiving the precipitated matter from the sewage, and which may be provided with closed slide opening for removing the accumulated deposit from time to time; or the conduit may have branch pipes at intervals at bottom leading to a pump or suction apparatus, by means of which the deposit may be drawn off from the conduit itself from time to time.

I do not wish to be understood as broadly claiming an apparatus for treating sewage and other liquids by an electric current, as such in itself is not my invention.

Having thus described the nature of this invention and the best means I know for carrying the same into practical effect, I claim—

1. An apparatus for purifying sewage, consisting of a tank forming a channel of considerable length for the passage of the sewage, and comprising oxidizable positive and negative electrodes of iron, connected, respectively, with the poles of an electrical generator, substantially as and for the purposes described.

2. An apparatus for purifying sewage, consisting of a tank forming a channel of considerable length for the passage of the sewage, and comprising positive electrodes and oxidizable electrodes of iron, said electrodes connected, respectively, with the poles of an electrical generator, substantially as and for the purposes described.

3. An apparatus for purifying sewage, consisting of a tank and positive and negative electrodes located therein and constituting partitions which form a channel of considerable length for the passage of the sewage, the negative electrodes being of iron and oxidizable, and said positive and negative electrodes connected, respectively, with the poles of an electrical generator, substantially as and for the purposes described.

4. An apparatus for purifying sewage, consisting of a tank and oxidizable positive and negative electrodes composed of iron plates arranged alternately, as set forth, to form a channel of considerable length for the passage of the sewage, said positive and negative electrodes connected, respectively, with the poles of an electrical generator, substantially as and for the purposes described.

In testimony whereof I have signed my name to this specification, in the presence of two subscribing witnesses, this 9th day of March, 1888.

WILLIAM WEBSTER, Jr.

Witnesses:
OLIVER IMRAY,
*Patent Agent.*
JNO. P. M. MILLARD,
*Clerk to Messrs. Abel & Imray, Consulting Engineers and Patent Agents, 28 Southampton Buildings, London, W. C.*